(12) United States Patent
Kuo

(10) Patent No.: US 12,362,856 B2
(45) Date of Patent: Jul. 15, 2025

(54) TRELLIS CODED DFTS-OFDM

(71) Applicant: MEDIATEK INC., Hsinchu (TW)

(72) Inventor: Chun-Hsuan Kuo, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/517,186

(22) Filed: Nov. 22, 2023

(65) Prior Publication Data
US 2024/0178937 A1    May 30, 2024

Related U.S. Application Data

(60) Provisional application No. 63/384,961, filed on Nov. 24, 2022.

(51) Int. Cl.
*H04L 1/00*      (2006.01)
*H04L 27/26*    (2006.01)

(52) U.S. Cl.
CPC .......... *H04L 1/006* (2013.01); *H04L 27/2627* (2013.01); *H04L 27/264* (2013.01)

(58) Field of Classification Search
CPC ..... H04L 1/0058; H04L 1/0069; H04L 1/006; H04L 1/0061; H04L 1/0064; H04L 1/0057; H04L 27/2627; H04L 27/2628; H04L 27/264; H04L 27/26414; H04L 27/26416
See application file for complete search history.

(56) References Cited

U.S. PATENT DOCUMENTS

| | | | |
|---|---|---|---|
| 2005/0047514 A1* | 3/2005 | Bolinth | H04L 1/005 375/261 |
| 2006/0274852 A1* | 12/2006 | Trachewsky | H04L 1/0002 375/295 |
| 2010/0239038 A1* | 9/2010 | Seyedi-Esfahani | H04L 27/3411 375/261 |
| 2017/0353340 A1* | 12/2017 | Raphaeli | H04L 27/3411 |

* cited by examiner

*Primary Examiner* — Khanh C Tran
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a transmitter. The transmitter receives a plurality of input bits. The transmitter encodes the plurality of input bits using a Trellis code to generate a plurality of output symbols. The Trellis code is configured to confine amplitude fluctuations between consecutive output symbols. The transmitter pulse shapes the output symbols in a frequency domain. The transmitter maps the pulse shaped symbols onto a plurality of subcarriers. The transmitter generates a time domain waveform based on the mapped symbols. The transmitter transmits the time domain waveform.

17 Claims, 12 Drawing Sheets

TRELLIS CODED DFTS-OFDM

CROSS-REFERENCE TO RELATED APPLICATION(S)

This application claims the benefits of U.S. Provisional Application Ser. No. 63/384,961, entitled "TRELLIS CODED DFTS-OFDM (TC-DFTS-OFDM): A POWER EFFICIENT WAVEFORM FRAMEWORK CONFIGURATION" and filed on Nov. 24, 2022, which is expressly incorporated by reference herein in its entirety.

BACKGROUND

Field

The present disclosure relates generally to communication systems, and more particularly, to techniques of generating Trellis coded DFTS-OFDM waveform.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a transmitter. The transmitter receives a plurality of input bits. The transmitter encodes the plurality of input bits using a Trellis code to generate a plurality of output symbols. The Trellis code is configured to confine amplitude fluctuations between consecutive output symbols. The transmitter pulse shapes the output symbols in a frequency domain. The transmitter maps the pulse shaped symbols onto a plurality of subcarriers. The transmitter generates a time domain waveform based on the mapped symbols. The transmitter transmits the time domain waveform.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
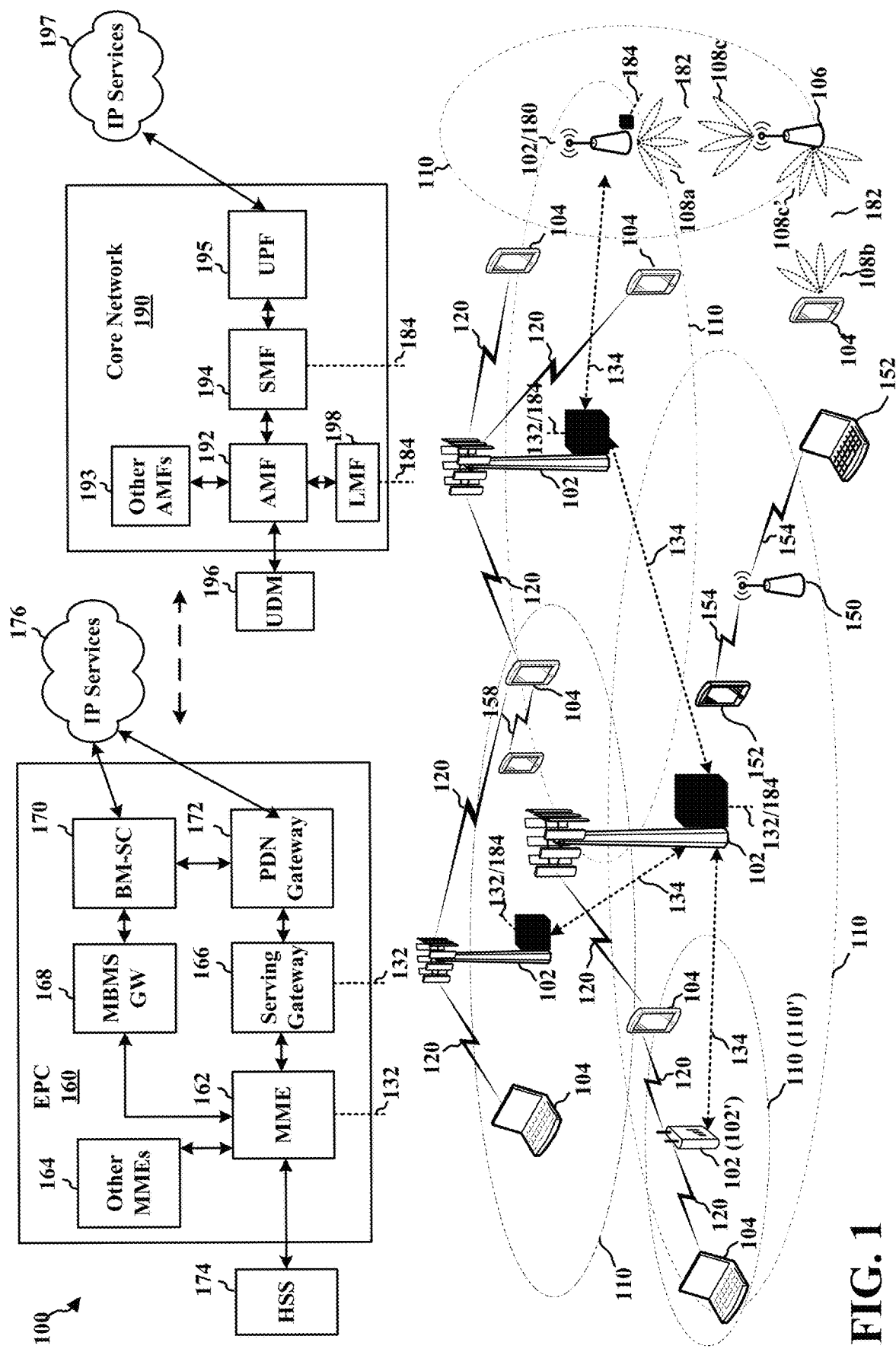
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102" may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102" may employ NR and use the same 5 GHZ unlicensed frequency spectrum as used by the Wi-Fi AP 150. The small cell 102″, employing NR in an unlicensed frequency spectrum, may boost coverage to and/or increase capacity of the access network.

A base station 102, whether a small cell 102′ or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
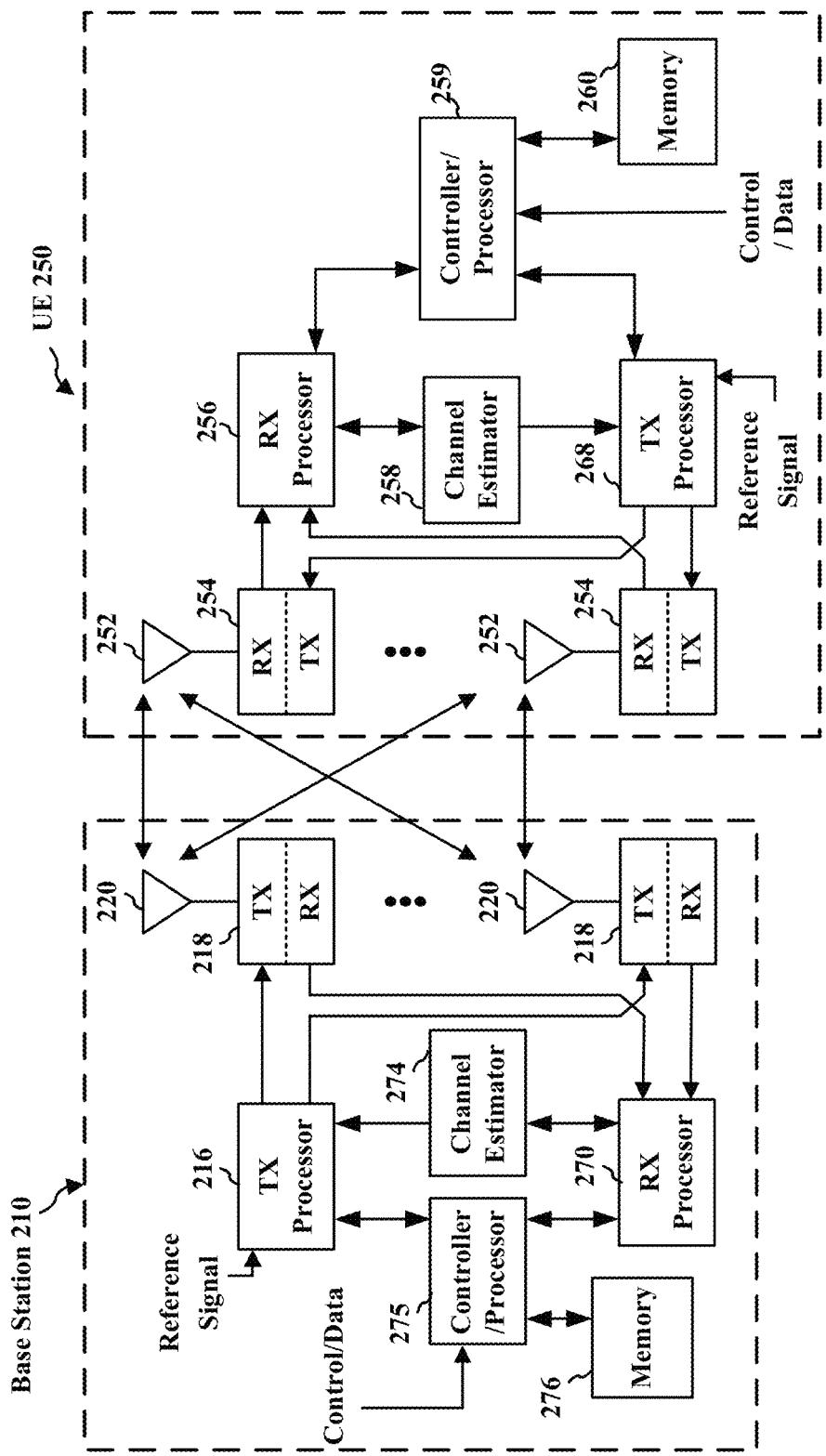
FIG. 2 is a diagram illustrating a base station in communication with a UE in an access network.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies. FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs: and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs: and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers for each RB with a subcarrier spacing (SCS) of 60 KHz over a 0.25 ms duration or a SCS of 30 kHz over a 0.5 ms duration (similarly, 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
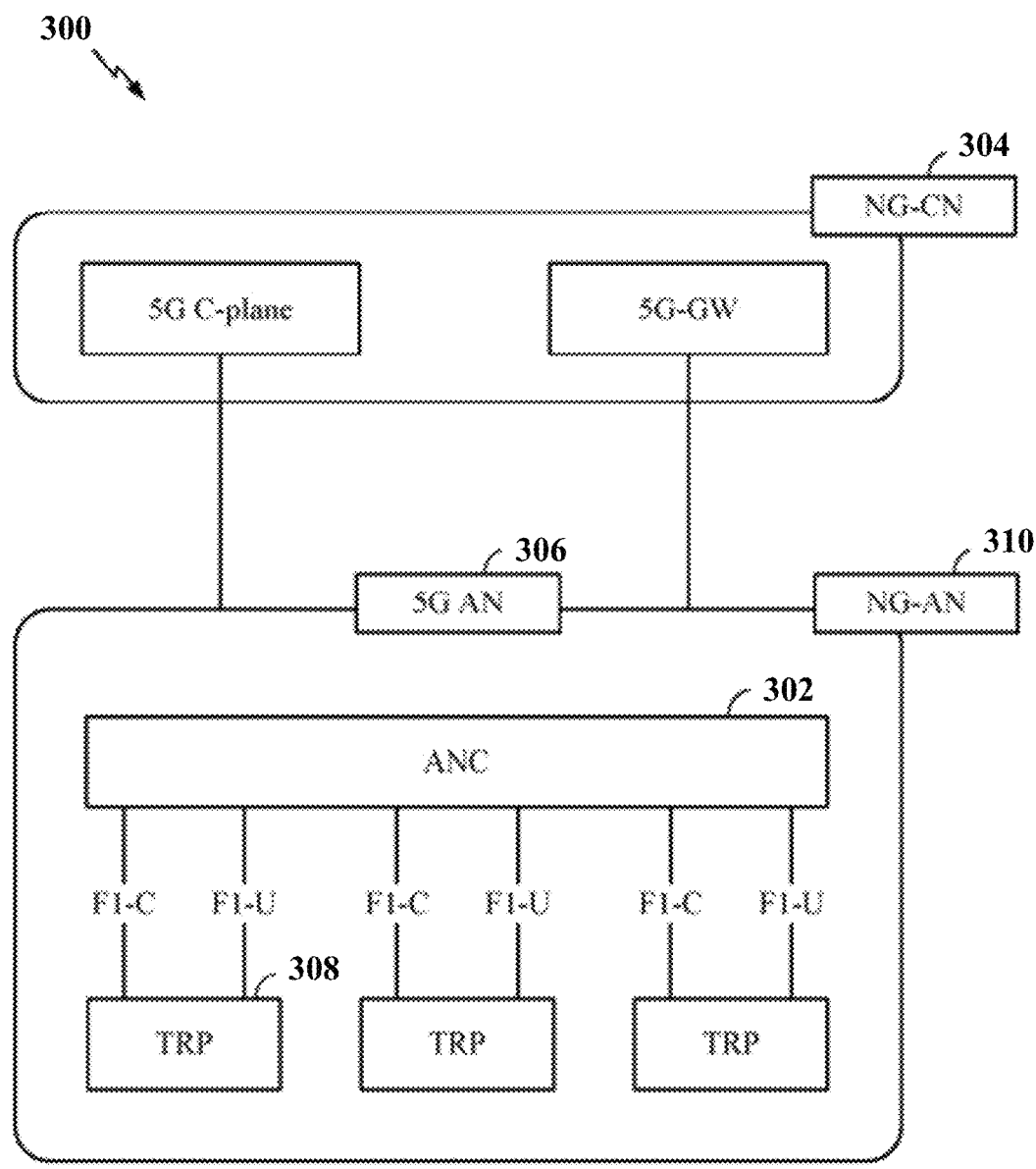
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
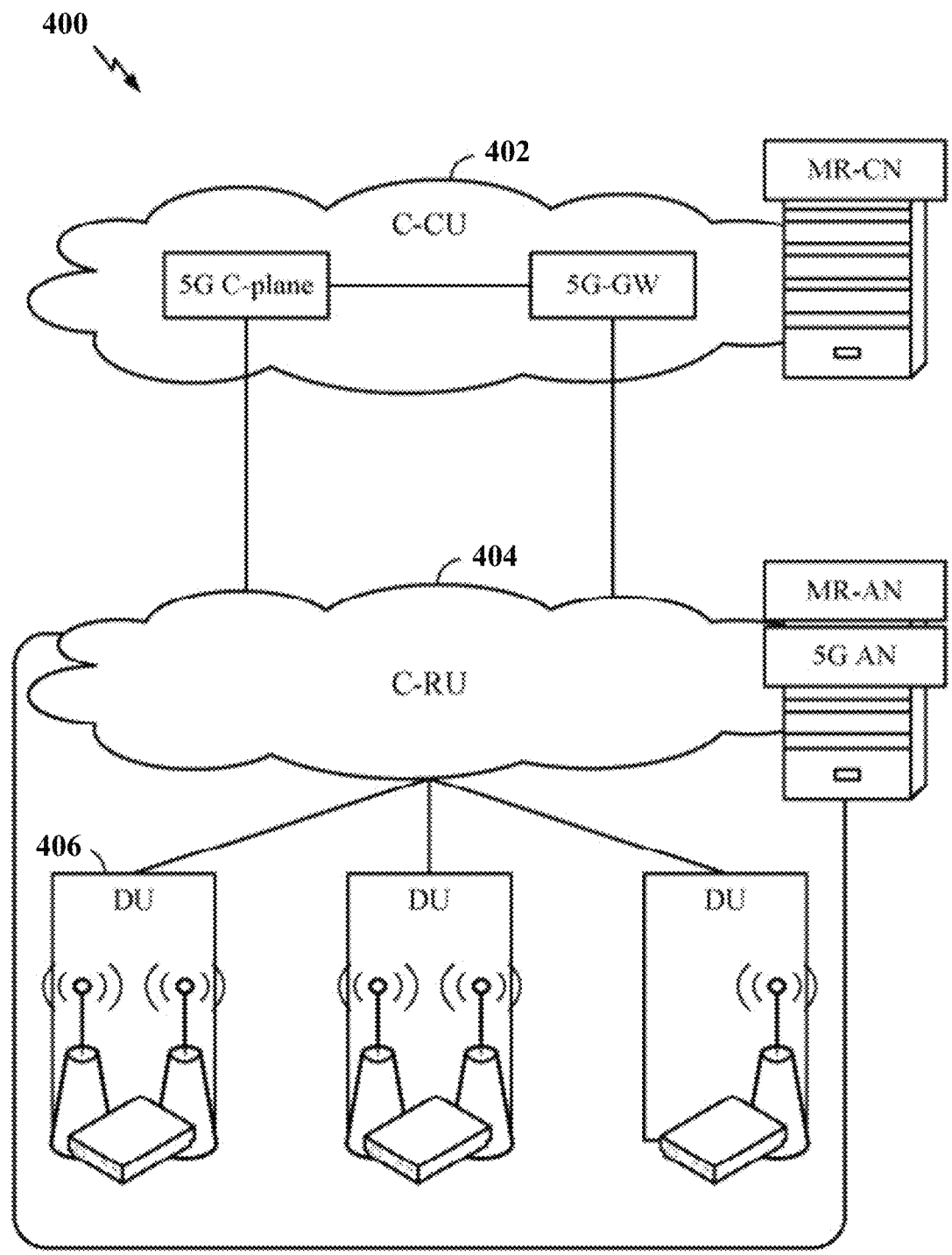
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
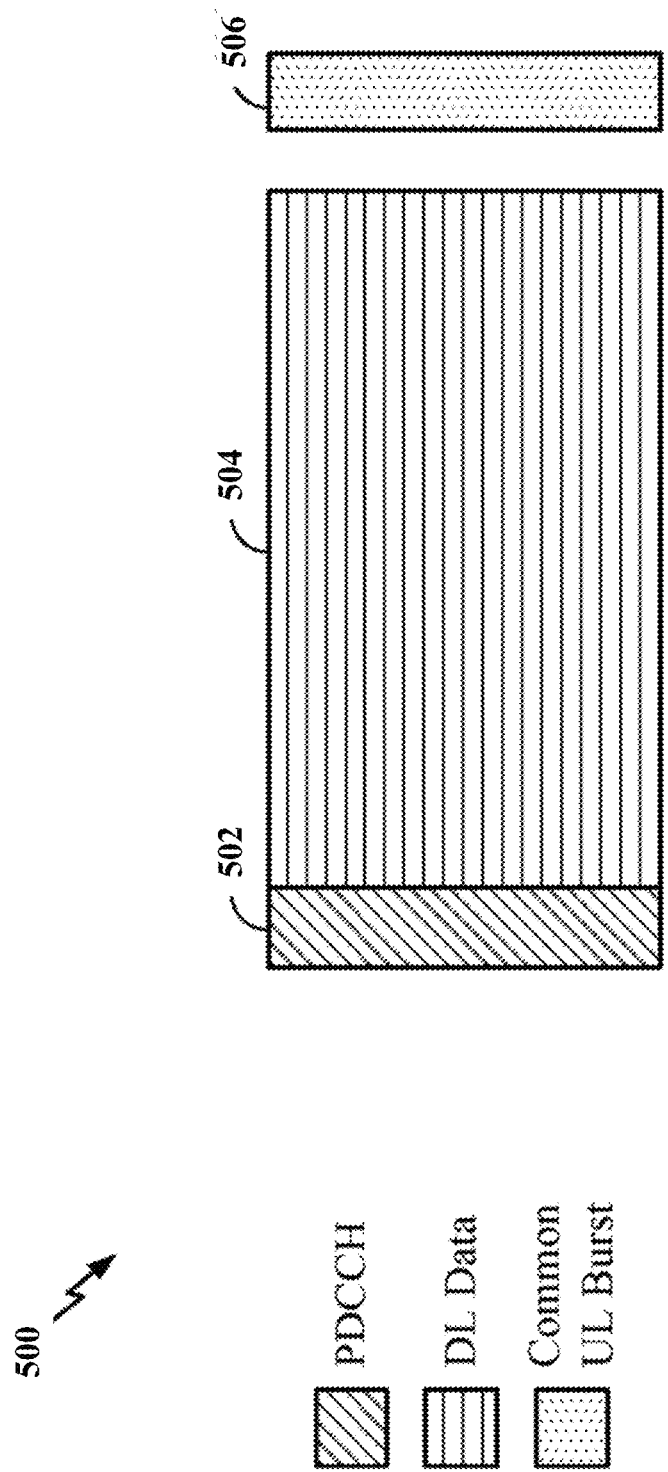
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
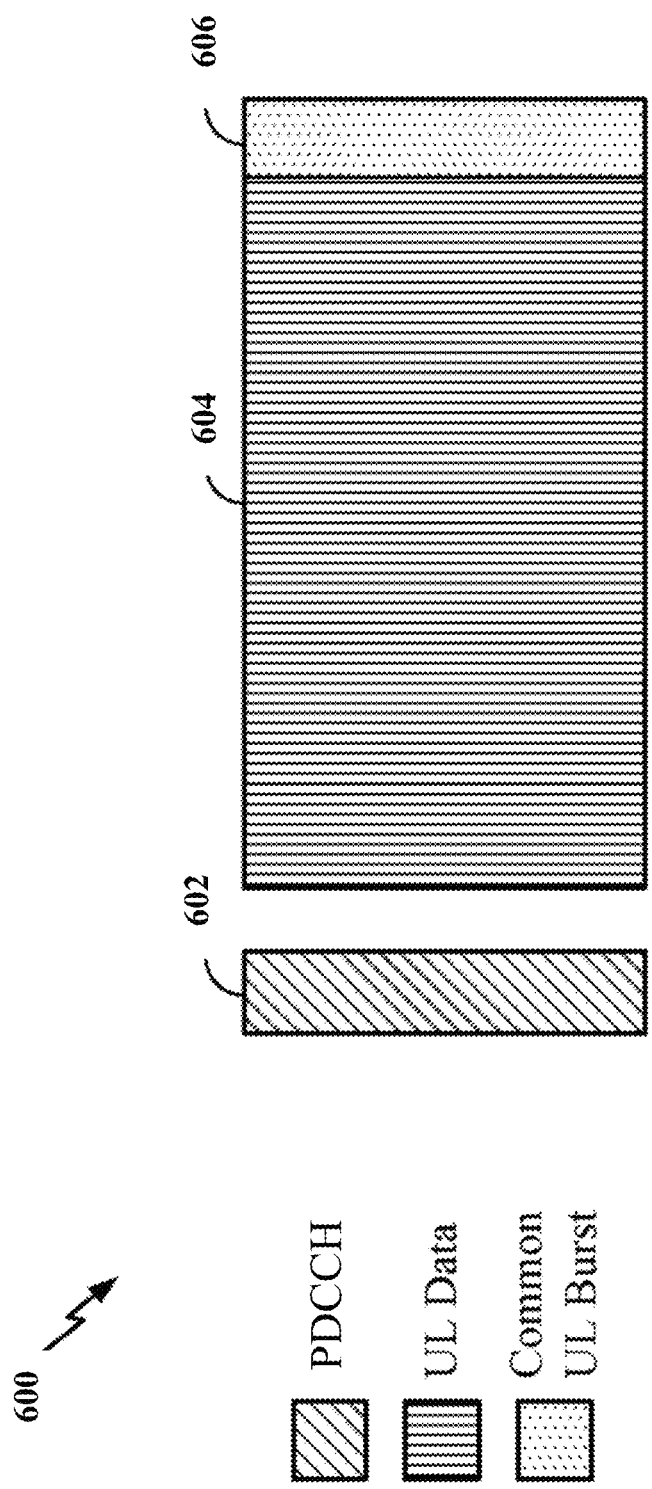
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The present disclosure is directed to a new waveform design called Trellis-Coded DFTS-OFDM (TC-DFTS-OFDM) that defines a family of waveforms with low peak-to-average power ratio (PAPR). TC-DFTS-OFDM is a combination of coded modulation and DFTS-OFDM.

Figure 7:
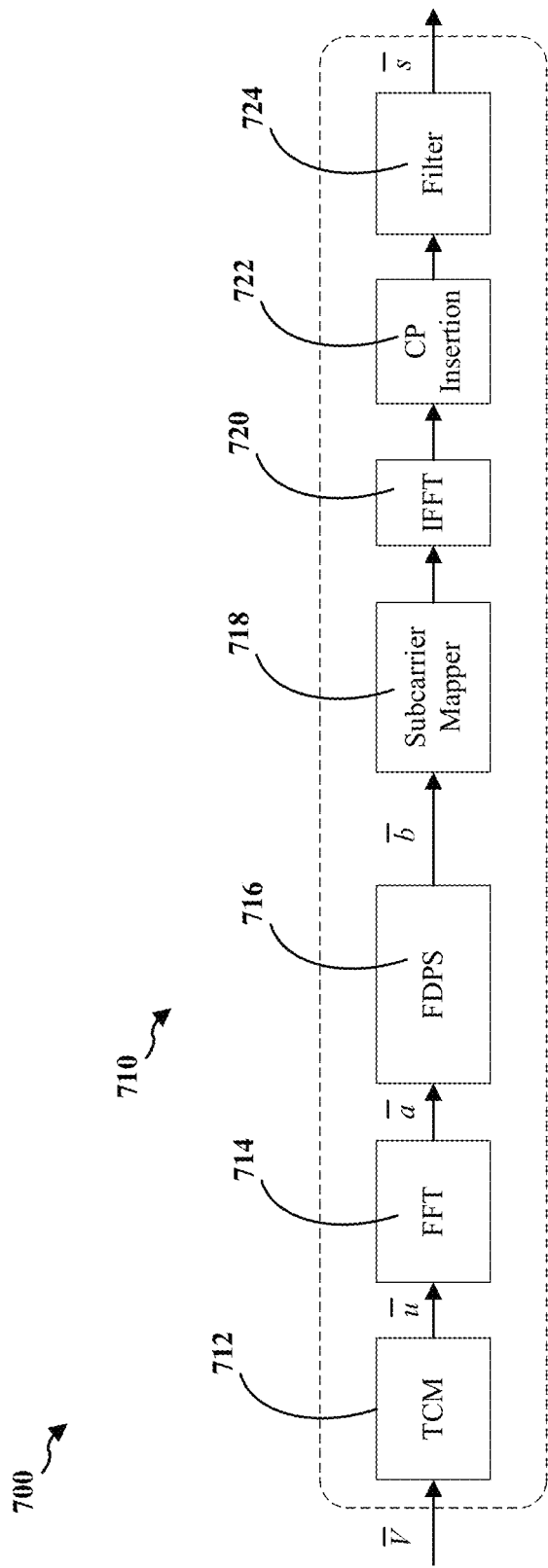
FIG. 7 is diagram illustrating a transmitter chain.

FIG. 7 is diagram 700 illustrating a transmitter chain. In this example, a transmitter chain 710 includes a TCM component 712, a FFT component 714, a FDPS component 716, a subcarrier mapper 718, an IFFT component 720, a CP insertion component 722, and a filter 724.

The TCM component 712 confines the phase transition between consecutive symbols such that the signal trajectory exhibits reduced or optimum (minimum) amplitude fluctuation. This is done by properly designing the Trellis code to optimize the tradeoff between PAPR and spectral efficiency. In particular, the TCM component 712 confines amplitude to power fluctuation between consecutive outputs.

The TCM component 712 takes binary inputs and outputs complex constellation symbols. It is designed to reduce the amplitude changes between consecutive symbols to keep the trajectory close to the unit circle, resulting in low PAPR.

The FFT component 714 receives the complex constellation symbols from the TCM component 712 as input symbols and performs a Fast Fourier Transform on the input symbols to convert them to the frequency domain. This allows the symbols to be mapped onto orthogonal frequency division multiplexed (OFDM) subcarriers by the subcarrier mapper 718.

The FDPS component 716 further transforms the symbols from the FFT component 714 to shape the signal trajectory to achieve lower PAPR/cubic metric (CM). It also provides tradeoffs between spectral efficiency and power efficiency. The FDPS component 716 may truncate some symbols generated by the TCM component 712, trading off PAPR for higher spectral efficiency. The amount of truncation can be tuned based on the usage scenario and requirements.

The subcarrier mapper 718 maps the frequency domain symbols onto the allocated subcarriers. This converts the frequency domain symbols into an OFDM signal. The IFFT component 720 then performs an Inverse FFT to convert the frequency domain OFDM signal back to the time domain for transmission. The CP insertion component 722 inserts a cyclic prefix into the time domain signal to mitigate inter-symbol interference.

The filter 724 performs shaping to the transmitted signal to control the spectral shape and out-of-band emissions. Specifically, it helps smoothen the abrupt transitions in the transmitted waveform to reduce spectral sidelobes. This allows the signal to better fit into the allocated frequency band and reduces interference to adjacent frequency channels.

The TCM component 712 takes binary input bits and maps them to complex constellation symbols. The parameters of the TCM component 712 can include:
- $\bar{v}$: K×1 vector of input bits. This vector represents the input bits to the TCM component 712 each time.
- $\bar{u}$: M×1 vector of output constellation symbols. This vector represents M symbols output by the TCM component 712 based on the K input bits.
- $R \equiv K/M \leq Q$, where Q is the modulation order of the potential constellation diagram of TCM. The rate R specifies how many input bits are mapped to each output symbol. It represents the efficiency of the mapping from bits to symbols. The maximum possible rate is limited by the modulation order Q of the TCM's constellation diagram.

The FDPS component 716 may implement pulse shaping in the frequency domain by multiplying the input vector $\bar{a}$ element-wise with a pulse shaping vector $\bar{G}$, represented as follows:

$$\bar{b} = \bar{G} \odot \bar{a},$$

where $\bar{b}$ is the output vector after pulse shaping: $\bar{G}$ is the pulse shaping vector: $\odot$ represents element-wise multiplication: $\bar{a}$ is the input vector before pulse shaping. Each element of the input vector $\bar{a}$ is multiplied with the corresponding element in the pulse shaping vector $\bar{G}$. The pulse shaping filter is applied independently to each frequency subcarrier. This allows shaping the signal in the frequency domain to control spectral properties.

The pulse shaping vector $\bar{G}$ contains the windowing factors that will be applied to each subcarrier. Different window shapes like raised cosine can be used to achieve certain spectral characteristics.

The FFT component 714 inputs M frequency domain symbols $u_m$, $m \in (0, \ldots, M-1)$ to the FDPS component 716. The FDPS component 716 applies Faster Than Nyquist (FTN) signaling processing to $u_m$. The subcarrier mapper 718 maps the M frequency domain symbols to N orthogonal subcarriers of the IFFT component 720.

The IFFT component 720 generates $$s(t) = \sum_{m=0}^{M-1} u_m g\left(\frac{t}{NT_s} - \frac{m}{M}\right), 0 \leq t \leq NT_s,$$

where g(t) is the corresponding time-domain pulse shape of G(f) and is periodic with periodicity 1; M is number of input frequency domain symbols: N is number of output time domain symbols: and $T_S$ is time domain sampling interval. The symbol Rate:

$$\frac{M}{NT_s}.$$

This allows mapping single carrier waveforms onto the proposed waveform framework.

The function g(t) is the time-domain pulse shape corresponding to the frequency domain pulse shaping filter G(f). This g(t) is periodic with a periodicity of 1. Each input symbol $u_m$ is modulated by a time-shifted version of g(t), shifted by $$\frac{m}{M}.$$

This has the effect of mapping the symbols $u_m$ onto subcarriers that are orthogonal in the frequency domain. The time t goes from 0 to $NT_s$, where N is the number of output symbols and $T_S$ is the sampling interval in the time domain.

As such, the IFFT component 720 construct a DFTS-OFDM signal by summing up contributions from input symbols $u_m$, each modulated on a subcarrier using the pulse shape g(t). The subcarriers are orthogonal in frequency due to the shifts of g(t).

Faster-than-Nyquist (FTN) signaling aims to transmit at rates higher than the Nyquist rate by intentionally allowing inter-symbol interference. There are two ways FTN can be implemented using the frequency domain pulse shaping (FDPS) in the waveform framework.

First, symbol rate can be increased by keeping the pulse shape g(t) unchanged and transmitting symbols closer together in time. This increases inter-symbol interference as symbols are spaced closer than the Nyquist criteria. However, the interference can be compensated by using equalization techniques at the receiver.

Second, the FDPS G(f) can be squeezed or compressed in the frequency domain by a factor α, where 0<α≤1. This is implemented by $\tilde{G}(f)=G(f/\alpha)$. A smaller α value implies more compression of G(f). Squeezing the FDPS effectively "stretches" the corresponding pulse shape g(t) in the time domain. Stretching g(t) brings symbols closer together in time, enabling FTN signaling.

Without frequency domain pulse shaping (FDPS), the frequency domain symbols ā of TC-DFTS-OFDM occupy M subcarriers. This is equivalent to having a rectangular FDPS filter of length M and height 1. The FDPS component 716 applies faster-than-Nyquist (FTN) signaling to increase the spectral efficiency (SE). Specifically, the FDPS component 716 can squeeze or compress the rectangular FDPS in frequency by a factor of α.

For example, for α=0.5, the FDPS is a rectangular filter with length M/2 and height 1. This compresses the FDPS by 2× in frequency. Compressing the FDPS increases the SE by a factor of 1/α. Here, with α=0.5, the SE doubles to 1/α=2. However, lowering α generally increases the peak-to-average power ratio (PAPR). So there is a tradeoff between higher SE and higher PAPR. For the same SE of 2.0 bits/s/Hz, TC-DFTS-OFDM with QPSK and compressed FDPS of α=0.5 may have a 1.6 dB PAPR advantage over standard QPSK modulated DFTS-OFDM.

Further enhancement on the PAPR/SE tradeoff could be achieved via a combination of grid-based waveform precoder and FDPS design. For example, RRC (Root Raised Cosine) FDPS could be used instead of rectangular FDPS, with roll-off factor β as a tuning parameter. Additionally, FDPS truncation could also be applied. FIG. 16 shows multiple QPSK TC-DFTS-OFDM schemes with different SEs, using RRC FDPS with β=1.0 and FTN ratio α=0.57, followed by proper FDPS truncation. An additional 0.5 dB PAPR gain could be observed. Moreover, FDPS design could also start from designing a suitable time-domain pulse shape g(t), such as the half-cosine pulse shape for MSK (Minimum Shift Keying).

Furthermore, spectral efficiency and power efficiency should be considered jointly to achieve proper tradeoffs. For example, with the following simulation settings: Forward error correction (FEC) code: (K=2100, N=4200) rate 1/2 NR LDPC; Channel: Additive white Gaussian noise (AWGN); Receiver equalizer: Linear minimum mean square error (LMMSE), the Total transmit energy per noise power spectral density ratio is:

$$E_s/N_0 \text{ (dB)} = E_b/N_0 \text{ (dB)} + \text{PAPR (dB)},$$

where $E_b/N_0$ is the bit energy to noise ratio and PAPR is the peak-to-average power ratio.

When considering the tradeoff between spectral efficiency (SE) and power efficiency, TC-DFTS-OFDM demonstrates significant gains over cyclic prefix OFDM (CP-OFDM) and DFTS-OFDM, especially in the low SE region. The peak-to-average power ratio (PAPR) and block error rate (BLER) performance should be optimized together to achieve the best tradeoff between SE and power efficiency.

For example, compared to CP-OFDM and DFTS-OFDM, TC-DFTS-OFDM shows considerable gains in power efficiency for the same SE, particularly when operating at low spectral efficiency.

Figure 8:
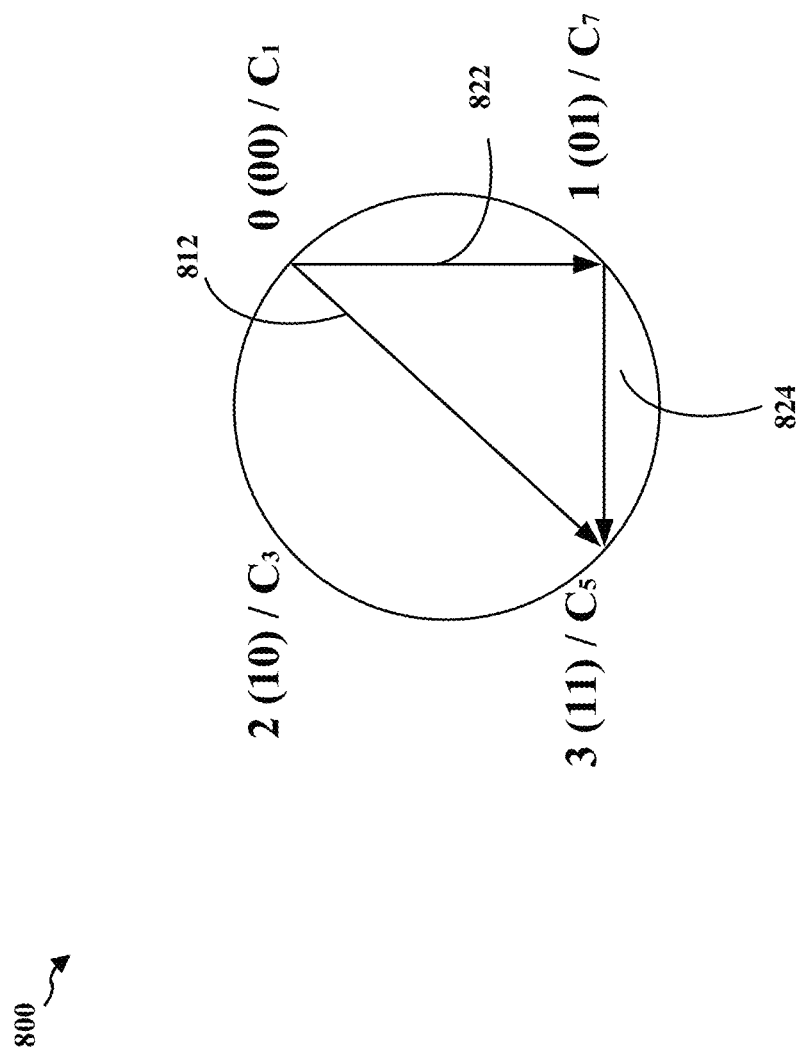
FIG. 8 is a diagram illustrating a first Trellis coding example.

FIG. 8 is a diagram 800 illustrating a first Trellis coding example. In this example, the constellation is QPSK (Quadrature Phase Shift Keying). Without any coding, the input bits are directly mapped to QPSK constellation points. For example, input bits '00' may be mapped to point 0-(00) and a symbol $C_1$, '01' to 1-(01) and a symbol $C_7$, '10' to 2-(10) and a symbol $C_3$, and '11' to 3-(11) and a symbol $C_5$. In this uncoded case, if the current point is 0-(00) and the input bits are '11', then the next point is 3-(11). A symbol $C_5$ is generated and the signal will jump directly from 0-(00) to 3-(11) through a path 812. This transition passing through the origin causes high peak-to-average power ratio (PAPR).

To reduce PAPR, the TCM component 712 uses Trellis coding before modulation. After receiving input bits '00', instead of directly mapping '11' to 3-(11), the TCM component 712 codes it into two points 1-(01) and 3-(11). As such, the sequence goes from 0-(00) to 1-(01) to 3-(11) through a path 822 and a path 824 instead of directly from 0-(00) to 3-(11) through the path 812. Accordingly, the TCM component 712 generates two symbols C7 and C5. This reduces amplitude fluctuations and PAPR.

The transmitter chain 710 now transmits 2 symbols instead of 1 symbol per input bit pair. So the spectral efficiency is reduced by half. This is the tradeoff between PAPR and spectral efficiency. Although the data rate is halved, the significant PAPR reduction allows operating power amplifiers more efficiently. So for power-limited applications, this tradeoff is desirable.

Figure 9:
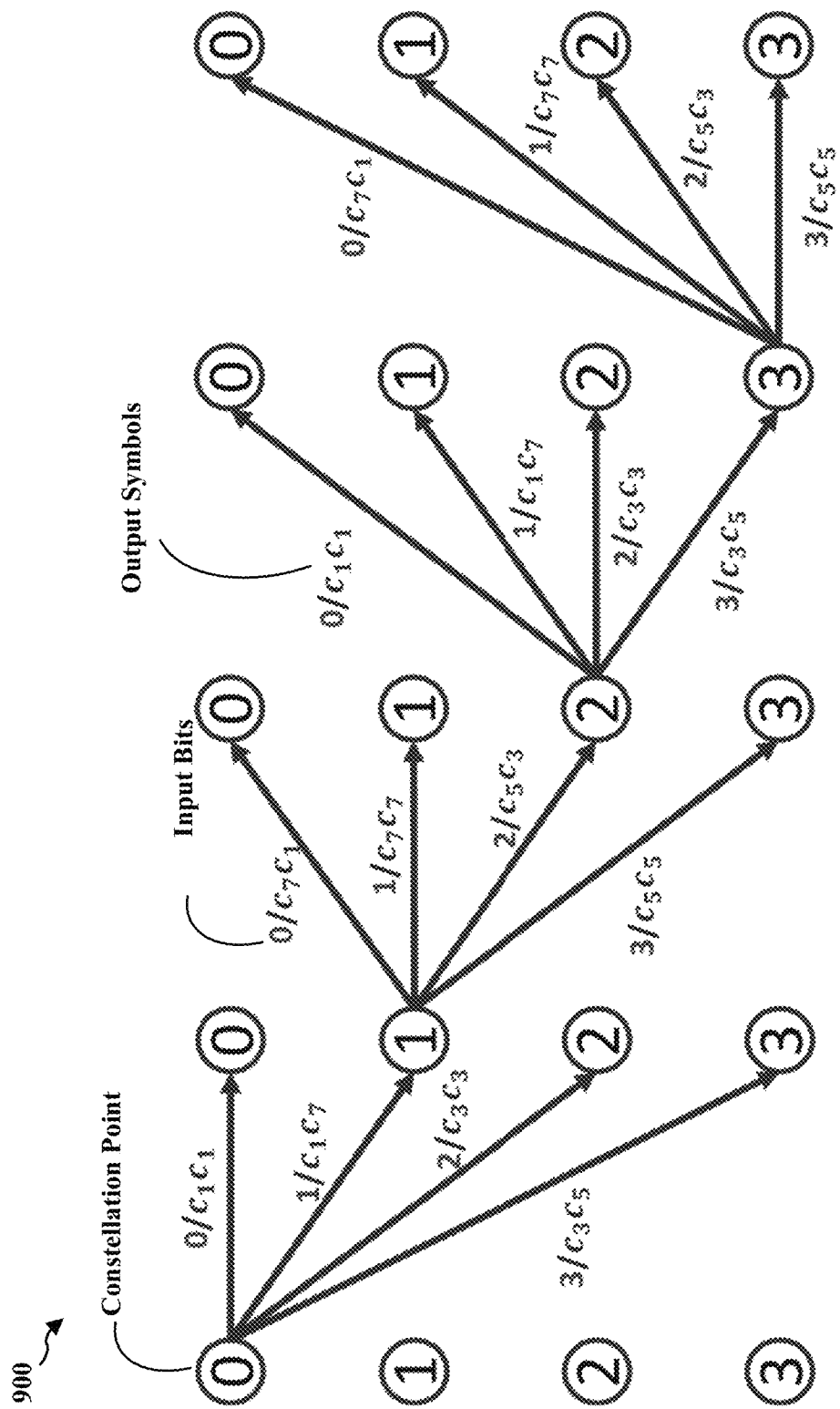
FIG. 9 is a diagram illustrating a second Trellis coding example.

FIG. 9 is a diagram 900 illustrating a second Trellis coding example. The specific Trellis structure and output mapping can be optimized to balance performance, spectral efficiency, and power efficiency. In this example, the constellation used is QPSK, same as the previous example in FIG. 8. The diagram shows the mapping of input bits to output symbols through the Trellis states. The input bits '00', '01', '10', and '11' are mapped to constellation points 0, 1, 2, and 3 respectively, same as before. The output symbols depend on both the current state and input bits, as defined by the TCM component 712. The overall goal is still to generate output symbols that transition smoothly between states and reduce amplitude fluctuations.

When the Trellis is in state 0, there are 4 possible transitions: If the input bits are '00', the output symbols will be C1 and C1. This will cause the Trellis to transition back to state 0, corresponding to remaining at the same constellation point 0 in the QPSK modulation. If the input bits are '01', the output symbols will be C1 and C7. This will cause the Trellis to transition to state 1, corresponding to moving from constellation point 0 to point 1 in QPSK. If the input bits are '10', the output symbols will be C3 and C3. This will cause the Trellis to transition to state 2, corresponding to moving from point 0 to point 2 in QPSK. Finally, if the input bits are '11', the output symbols will be C3 and C5. This will cause the Trellis to transition to state 3, corresponding to moving from point 0 to point 3 in QPSK.

When the Trellis is in state 1, there are again 4 possible transitions: If the input bits are '00', the output symbols will be C7 and C1. This will cause the Trellis to transition back to state 0), corresponding to moving from constellation point 1 back to point 0 in QPSK. If the input bits are '01', the output symbols will be C7 and C7. This will keep the Trellis in state 1, corresponding to remaining at the same constellation point 1 in QPSK. If the input bits are '10', the output symbols will be C5 and C3. This will cause the Trellis to transition to state 2, corresponding to moving from point 1 to point 2 in QPSK. Finally, if the input bits are '11', the output symbols will be C5 and C5. This will cause the Trellis to transition to state 3, corresponding to moving from point 1 to point 3 in QPSK.

When the Trellis is in state 2, there are 4 possible transitions: If the input bits are '00', the output symbols will be C1 and C1. This will cause the Trellis to transition back to state 0 corresponding to moving from constellation point 2 back to point 0 in QPSK. If the input bits are '01', the output symbols will be C1 and C7. This will cause the Trellis to transition to state 1, corresponding to moving from point 2 to point 1 in QPSK. If the input bits are '10', the output symbols will be C3 and C3. This will keep the Trellis in state 2, corresponding to remaining at the same constellation point 2 in QPSK. Finally, if the input bits are '11', the output symbols will be C3 and C5. This will cause the Trellis to transition to state 3, corresponding to moving from point 2 to point 3 in QPSK.

When the Trellis is in state 3, there are 4 possible transitions: If the input bits are '00', the output symbols will be C7 and C1. This will cause the Trellis to transition back to state 0, corresponding to moving from constellation point 3 back to point 0 in QPSK. If the input bits are '01', the output symbols will be C7 and C7. This will cause the Trellis to transition to state 1, corresponding to moving from point 3 to point 1 in QPSK. If the input bits are '10', the output symbols will be C5 and C3. This will cause the Trellis to transition to state 2, corresponding to moving from point 3 to point 2 in QPSK. Finally, if the input bits are '11', the output symbols will be C5 and C5. This will keep the Trellis in state 3, corresponding to remaining at the same constellation point 3 in QPSK.

Figure 10:
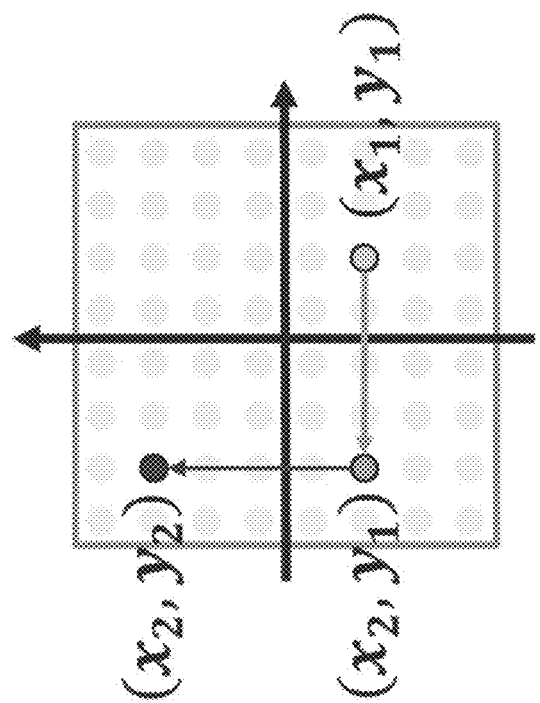
FIG. 10 is a diagram illustrating a third Trellis coding example.

FIG. 10 is a diagram 1000 illustrating a third Trellis coding example. In this example, the TCM component 712 implements a QAM (Quadrature Amplitude Modulation) constellations. Further, the state size is the same as the QAM constellation size. In other words, the number of states in the Trellis structure is the same as total number of points in the QAM constellation diagram. Each state corresponds to a QAM constellation point. The total number of different possible input values is the same as the state size and the QAM constellation size.

In one example, the current state is QAM constellation point $(x_1, y_1)$. The input is $(x_2, y_2)$. The next state is QAM constellation point $(x_2, y_2)$. The output are two symbols corresponding to 2 QAM constellation points $\{(x_2, y_1), (x_2, y_2)\}$. The rate is $R=Q/2$, where Q is the QAM modulation order.

More specifically, instead of making a large transition directly from $(x_1, y_1)$ to $(x_2, y_2)$ which can cause high PAPR, the TCM component 712 makes the transition in two steps by first shifting along the horizontal axis and then along the vertical axis. This avoids going through the origin and results in lower PAPR.

The Trellis state represents the current QAM constellation point. The input bits determine the next desired QAM constellation point $(x_2, y_2)$. Instead of directly transitioning to $(x_2, y_2)$, two output symbols are generated—one corresponding to $(x_2, y_1)$ and one for $(x_2, y_2)$. The next Trellis state is updated to $(x_2, y_2)$.

This construction allows the signal trajectory between QAM constellation points to be confined, avoiding large amplitudes and minimizing power fluctuations between symbols. The spectral efficiency is reduced to $R=Q/2$ due to the two-step transition. However, the significant PAPR reduction allows efficient operation of power amplifiers, making this trade-off advantageous for power-limited applications.

The TCM component 712 can generate output symbols in at least two options. In a first option, the TCM component 712 implements sequential generation using FSM (Finite State Machine) and LUT (Look-Up Table). In this example, so refers to the initial state of the Trellis structure. In Trellis coding, the TCM component 712 moves from state to state as it encodes the input bits. The input sequence $\bar{v}$ is the full sequence of binary input bits that will be encoded by the TCM component 712. It contains the information bits to be transmitted.

At Trellis section i, the TCM component 712 takes $n_v$ input bits $\tilde{v}_i \approx v_{in_v}^{(i+1)n_v-1}$ and generate $n_u$ output symbols $\tilde{u}_i \approx u_{in_u}^{(i+1)n_u-1}$. More specifically, at Trellis section i, the TCM component 712 processes the i-th block of $n_v$ input bits. The TCM component 712 then generates $n_u$ output symbols $\tilde{u}_i$, i.e. the i-th block of $n_u$ consecutive output symbols, based on the $n_v$ input bits $\tilde{v}_i$. That is, at each Trellis section, the TCM component 712 takes a block of $n_v$ input bits, generate a corresponding block of $n_u$ output symbols, then move to the next Trellis section.

By using a Finite State Machine (FSM), the TCM component 712 generates the output sequence $\bar{u}$ and new states $s_{i=1}^{n_T-1}$ sequentially using $(\tilde{u}_i, s_{i+1})=FSM(s_i, \tilde{v}_i)$, where $$n_T = \frac{K}{n_v} = \frac{M}{n_u}.$$

More specifically, at each Trellis section i, the TCM component 712 calls the FSM as: $(\tilde{u}_i, s_{i+1})=FSM(s_i, \tilde{v}_i)$, where si is the current Trellis state at section i, $\tilde{v}_i$ is the input block of $n_v$ bits at section i, $FSM(s_i, \tilde{v}_i)$ encodes the input $\tilde{v}_i$ based on current state $s_i$, generates the output symbol block $\tilde{u}_i$ of $n_u$ symbols, and transitions to a new state $s_{i+1}$. Thus, at each section, the TCM component 712 takes the current state $s_i$, processes the input $\tilde{v}_i$, generates the output $\tilde{u}_i$, and transitions to $s_{i+1}$ for the next section.

By calling the FSM sequentially for i=1 to $n_T-1$, the TCM component 712 generates the full output sequence $\bar{u}$ and full state sequence $$s_{i=1}^{n_T-1},$$

where $$n_T = \frac{K}{n_v} = \frac{M}{n_u}$$

gives the total number of Trellis sections based on the input bits K and output symbols M.

The first option works for general TCM structures by sequentially generating output symbols and states using FSM and LUT. It takes input bits in fixed blocks and generates corresponding number of output symbols.

In a second option, the TCM component 712 leverages Offset Quadrature Amplitude Modulation (OQAM) signal structure. The TCM component 712 splits the input bit sequence $\bar{v}$ into I component $\bar{v}_I=\bar{v}(0:2:K/2-2)$ and Q component $\bar{v}_Q=\bar{v}(1:2:K/2-1)$. $\bar{v}_I=\bar{v}(0:2:K/2-2)$ indicates that the TCM component 712 takes every other bit from $\bar{v}$, starting from index 0 and incrementing by 2, up to index K/2-2. This selects the bits at the even indices of $\bar{v}$ to form the I component sequence $\bar{v}_I$. $\bar{v}_Q=\bar{v}(1:2:K/2-1)$ indicates that the TCM component 712 takes every other bit from $\bar{v}$, starting from index 1 and incrementing by 2, up to index K/2-1. This selects the bits at the odd indices of $\bar{v}$ to form the Q component sequence $\bar{v}_Q$.

The TCM component 712 repeats $\bar{v}_I$ twice to form $$\bar{w}_I=\{\bar{v}_I(0),\bar{v}_I(0),\bar{v}_I(1),\bar{v}_I(1),\ldots,\bar{v}_I(K/2-1),\bar{v}_I(K/2-1)\}.$$

The TCM component 712 forms the OQAM I component sequence by repeating each bit in the original I sequence $\bar{v}_I$ twice to generate the corresponding symbols aligned at the symbol intervals.

The TCM component 712 repeats $\bar{v}_Q$ twice and right circular shift it by 1 to form $$\bar{w}_Q=\{\bar{v}_Q(K/2-1),\bar{v}_Q(0),\bar{v}_Q(0),\bar{v}_Q(1),\ldots,\bar{v}_Q(K/2-2),\bar{v}_Q(K/2-1)\}.$$

The TCM component 712 forms the OQAM Q component sequence by repeating and shifting the original Q sequence to align with the offsets required in OQAM signaling.

The TCM component 712 generates the output symbol sequence as:

$$\bar{u} = \frac{1}{\sqrt{2}}[(1-2\bar{w}_I)+j(1-2\bar{w}_Q)].$$

The I and Q component bits are mapped to constellation points with proper scaling and rotation to generate the final OQAM output symbols.

The second option specifically utilizes the OQAM signal structure by splitting input bits into I/Q streams, repeating and shifting to generate I/Q signals that directly map to the OQAM format. This applies for Trellis coding with QPSK but can be modified to support Trellis coding with QAM.

Figure 11:
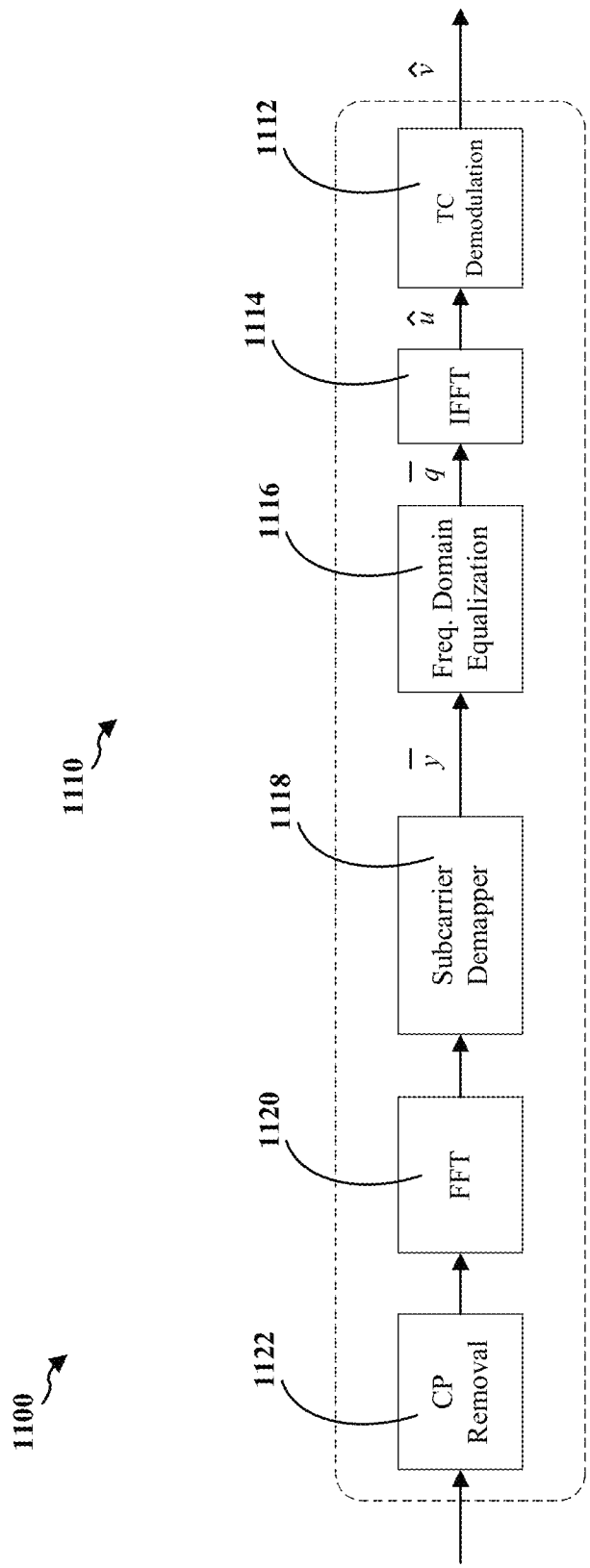
FIG. 11 is diagram illustrating a receiver chain.

FIG. 11 is diagram 1100 illustrating a receiver chain. In this example, a receiver chain 1110 includes a CP removal component 1122, an FFT component 1120, a subcarrier demapper 1118, a frequency domain equalization component 1116, an IFFT component 1114, and a TC demodulation component 1112.

The CP removal component 1122 removes the cyclic prefix inserted at the transmitter. The FFT component 1120 performs FFT on the received signal to convert to the frequency domain. The subcarrier demapper 1118 demaps the subcarriers to recover the frequency domain symbols. The frequency domain equalization component 1116 applies equalization to compensate for channel effects.

At the transmitter chain 710, the FFT component 714 mixes together the symbols across the subcarriers before transmission. After equalization, the IFFT component 1114 "undoes" the precoder mixing and allows recovery of the original symbols that were input to the FFT component 714 at the transmitter.

The TC demodulation component 1112 demodulates the Trellis coded modulation. It can use algorithms such as the forward-backward algorithm that operate on the Trellis structure to recover the originally transmitted bits. Soft information on the likelihood of each bit is generated as input. A min-sum algorithm minimizes a cost function over the Trellis states and transitions to find the most likely transmitted bit sequence.

The frequency domain equalization component 1116 may use single-tap LMMSE EQ:

$$q_i = \left[\frac{h_i^*}{|h_i|^2 + N_0/E_s}\right] y_i.$$

The single-tap LMMSE EQ equation performs linear minimum mean square error (LMMSE) equalization on each subcarrier using a single tap filter. $q_i$ is the equalized symbol on the ith subcarrier. $h_i^*$ is the complex conjugate of the channel response on the ith subcarrier. $|h_i|^2$ is the magnitude squared of the channel response on the ith subcarrier. $N_0/E_S$ is the ratio of noise power ($N_0$) to symbol energy ($E_S$). $y_i$ is the received symbol on the ith subcarrier. The LMMSE equalizer works by applying a simple single tap filter on each subcarrier to invert the channel. The filter is adapted based on the channel response $h_i$ and the noise power.

The IFFT component 1114 estimates the transmitted QAM symbols from the equalized frequency domain symbols $\bar{q}$ as:

$$\hat{u}=F_M^H \bar{q}.$$

$\hat{u}$ is the estimated QAM symbol. $F_M^H$ is the Hermitian (complex conjugate) transpose of the DFT matrix $F_M$. $\bar{q}$ is the vector of equalized frequency domain symbols. Specifically, the DFT matrix $F_M$ in the FFT component 714 maps symbols to subcarriers in the frequency domain. Its inverse $F_M^H$ goes in the reverse direction, mapping frequency domain subcarriers back to symbols.

Further, the frequency domain equalization component 1116 may use a model 1 for soft information: $\hat{u}_i=cu_i+e_i$, where $\hat{u}_i$ is the estimated QAM symbol on the ith subcarrier, c is a scalar constant for the channel, $u_i$ is the transmitted QAM symbol on the ith subcarrier, $e_i$ is the error between transmitted and received symbols. In particular:

$$c = \frac{1}{M}\sum_{i=0}^{M-1}\frac{|h_i|^2}{|h_i|^2 + N_0/E_s}$$

$$\sigma_e^2 = E\{|e_i|^2\} = \frac{E_s}{M}\sum_{i=0}^{M-1}\left[\frac{|h_i|^2}{|h_i|^2 + N_0/E_s} - c\right]^2 + \frac{N_0}{M}\sum_{i=0}^{M-1}\frac{|h_i|^2}{\left[|h_i|^2 + N_0/E_s\right]^2}$$

Alternatively, the frequency domain equalization component 1116 may use a model 2 for soft information: $\hat{u}_i = u_i + \tilde{e}_i$, where $\hat{u}_i$ is the estimated QAM symbol on the ith subcarrier, $u_i$ is the transmitted QAM symbol on the ith subcarrier, and $\tilde{e}_i$ is the error between transmitted and received symbols. This models the received symbol $\hat{u}_i$ as the transmitted symbol $u_i$ plus some error $\tilde{e}_i$. In particular:

$$\tilde{\sigma}_e^2 = E\{|\tilde{e}_i|^2\} = \frac{E_s}{M}\sum_{i=0}^{M-1}\left[\frac{|h_i|^2}{|h_i|^2 + N_0/E_s} - 1\right]^2 + \frac{N_0}{M}\sum_{i=0}^{M-1}\frac{|h_i|^2}{\left[|h_i|^2 + N_0/E_s\right]^2}$$

The TC demodulation component 1112 demodulates the Trellis coded modulation using algorithms such as forward-backward algorithm to recover the information bits. The TC demodulation component 1112 calculates a soft input as follows $$MI[u_i] = -\ln p(\hat{u}_i | u_i) \propto \frac{|\hat{u}_i - cu_i|^2}{\sigma_e^2},$$

where, $MI[u_i]$ is the soft input value for symbol i, $p(\hat{u}_i|u_i)$ is the probability distribution function of the estimated symbol $\hat{u}_i$ given the true symbol $u_i$, $\hat{u}_i$ is the estimated symbol on subcarrier i, $u_i$ is the true transmitted symbol on subcarrier i, c is the channel gain constant, and $\sigma_e$ is the standard deviation of the error.

The soft input is calculated as the negative log-likelihood ratio between the true symbol $u_i$ and estimated symbol $\hat{u}_i$. Assuming the error is Gaussian distributed, this log-likelihood ratio is proportional to the squared Euclidean distance between $\hat{u}_i$ and the scaled transmitted symbol $cu_i$, divided by the error variance $\sigma_e^2$. This incorporates both the symbol estimate and reliability information from the error distribution into an optimal soft input metric.

The TC demodulation component 1112 further calculates $$M[\tilde{u}_i] = \sum_{k=in_u}^{(i+1)n_u - 1} MI[u_k],$$

where, $M[\tilde{u}_i]$ is the combined soft input for the $i^{th}$ block of symbols, $\tilde{u}_i$ is the $i^{th}$ block of $n_u$ symbols, $MI[u_k]$ is the soft input for symbol k, $in_u$ is the start index of the $i^{th}$ block, and $(i+1)n_u - 1$ is the end index of the $i^{th}$ block. This sums up the individual soft inputs $MI[u_k]$ for all the symbols in the $i^{th}$ block from index $in_u$ to $(i+1)n_u - 1$. It combines the soft values into a total soft input $M[\tilde{u}_i]$ for the entire block of $n_u$ symbols. This provides aggregated soft information on each block of symbols to the TC demodulation component 1112 for decoding.

The TC demodulation component 1112 then determines the decoded bits as follows:

$$\hat{v}_i \approx MSM_0^{n_T - 1}[v_i] \approx \min_{(s_i, s_{i+1}, \tilde{u}_i): v_i}\left\{MSM_0^{i-1}[s_i] + M[\tilde{u}_i] + MSM_{i+1}^{n_T - 1}[s_{i+1}]\right\},$$

where, $\hat{v}_i$ is the decoded bits for the $i^{th}$ input block, $MSM_0^{n_T-1}[v_i]$ is the minimum state metric for decoding input block i, $s_i$ is the Trellis state at time i, $s_{i+1}$ is the Trellis state at time i+1, $\tilde{u}_i$ is the $i^{th}$ block of output symbols, $v_i$ is the $i^{th}$ block of input bits, $MSM_0^{i-1}[s_i]$ is the path metric entering state $s_i$, $M[\tilde{u}_i]$ is the aggregated soft input for output block $\tilde{u}_i$, and $MSM_{i+1}^{n_T-1}[s_{i+1}]$ is the path metric leaving state $s_{i+1}$. The Viterbi algorithm minimizes the overall path metric to find the most likely decoded bits $\hat{v}_i$. This is done by minimizing over all possible state pairs $s_i$, $s_{i+1}$ and output blocks $\tilde{u}_i$ corresponding to input $v_i$. The overall path metric is the sum of the entering path metric, aggregated soft output, and leaving path metric.

The TC demodulation component 1112 calculates the following:

$$MSM_0^i[s_{i+1}] = \min_{(s_i, \tilde{u}_i): s_{i+1}}\left\{MSM_0^{i-1}[s_i] + M[\tilde{u}_i]\right\},$$

where, $MSM_0^i[s_{i+1}]$ is the minimum state metric entering state $s_{i+1}$, and $MSM_0^{i-1}[s_i]$ is the state metric entering state $s_i$. The forward recursion of the Viterbi algorithm calculates the minimum state metric $MSM_0^i[s_{i+1}]$ entering each state at time i. This is done by minimizing over all prior states $s_i$ and outputs $\tilde{u}_i$ that lead into state $s_{i+1}$, taking the sum of the previous state metric and soft output.

The TC demodulation component 1112 calculates the following:

$$MSM_i^{n_T-1}[s_i] = \min_{(s_{i+1}, \tilde{u}_i): s_i}\left\{MSM_{i+1}^{n_T-1}[s_{i+1}] + M[\tilde{u}_i]\right\},$$

where $MSM_{i+1}^{n_T-1}[s_i]$ is the minimum state metric entering state $s_i$ at time i, and $MSM_{i+1}^{n_T-1}[s_{i+1}]$ is the state metric leaving state $s_{i+1}$. The backward recursion of the Viterbi algorithm calculates the minimum state metric $MSM_i^{n_T-1}[s_i]$ entering each state at time i. This is done by minimizing over all later states $s_{i+1}$ and outputs $\tilde{u}_i$ that lead out of state $s_i$, taking the sum of the later state metric and soft output.

The TCM demodulation uses algorithms like forward-backward algorithm on the Trellis structure to recover the transmitted bits. Soft information is generated as input, and the min-sum algorithm minimizes the cost function over the Trellis states and transitions.

Figure 12:
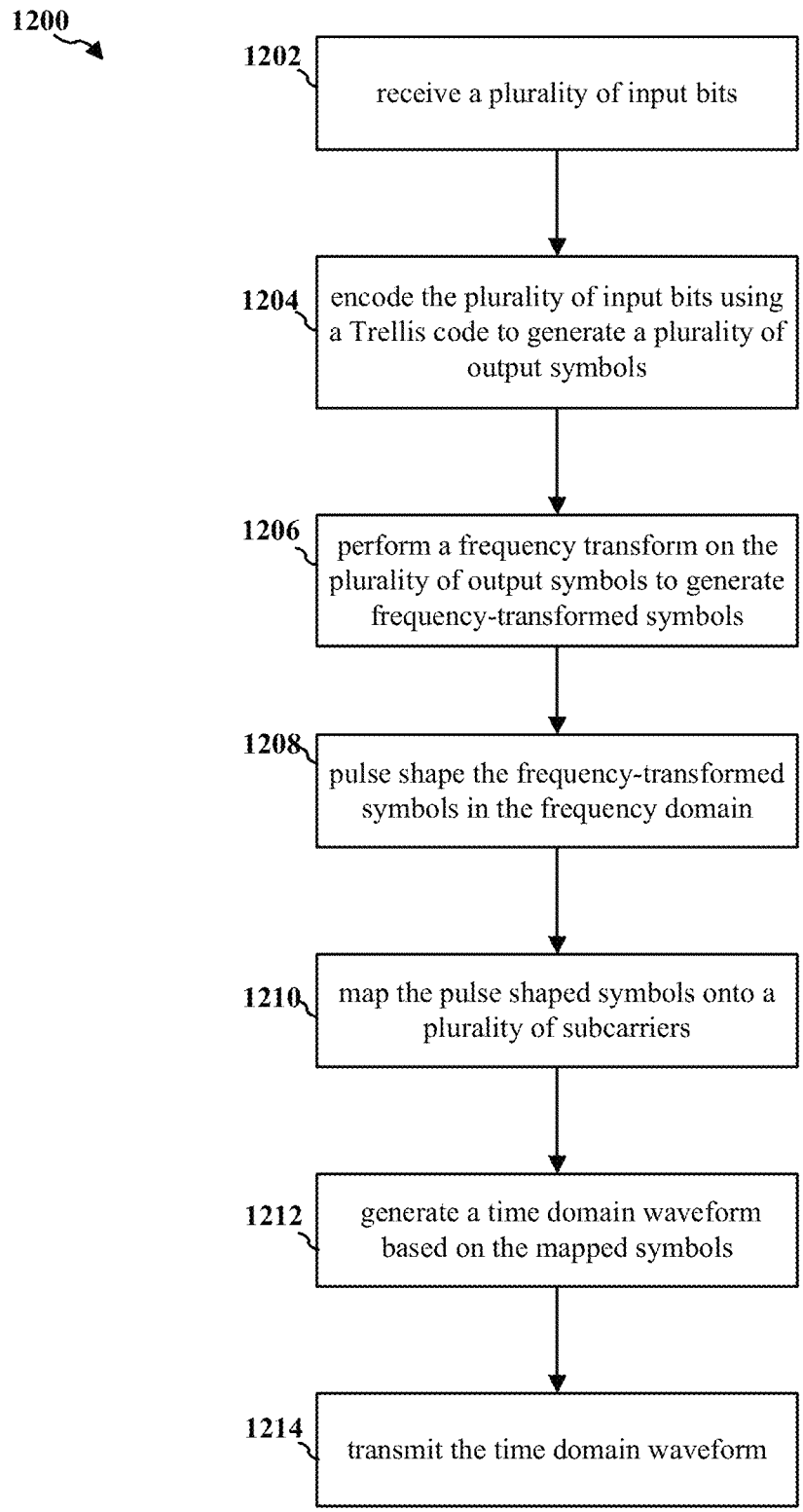
FIG. 12 is flowchart of a method (process) for generating a time domain waveform.

FIG. 12 is flowchart 1200 of a method (process) for generating a time domain waveform. The method may be performed by a transmitter (e.g., the base station 210, the UE 250). In operation 1202, the transmitter receives a plurality of input bits. In operation 1204, the transmitter encodes the plurality of input bits using a Trellis code to generate a plurality of output symbols. The Trellis code is configured to confine amplitude fluctuations between consecutive output symbols.

In operation 1206, the transmitter performs a frequency transform on the plurality of output symbols to generate frequency-transformed symbols. In operation 1208, the transmitter pulse shapes the frequency-transformed symbols in the frequency domain. In operation 1210, the transmitter maps the pulse shaped symbols onto a plurality of subcarriers.

In operation 1212, the transmitter generates a time domain waveform based on the mapped symbols. The time domain waveform is generated by performing an inverse frequency transform on the mapped symbols. In operation 1214, the transmitter transmits the time domain waveform.

In certain configurations, when encoding the plurality of input bits using the Trellis code, the transmitter determines a current state. The transmitter determines the plurality of output symbols and a next state based on the current state and the plurality of input bits.

The current state may correspond to a current constellation point. The plurality of input bits may indicate a next constellation point. The plurality of output symbols may comprise a first symbol corresponding to an intermediate constellation point corresponding to the current constellation point on a first axis and corresponding to the next constellation point on a second axis, and a second symbol corresponding to the next constellation point. The next state may correspond to the next constellation point.

The frequency transform on the plurality of initial symbols output from the Trellis modulation generates the plurality of output symbols to pulse shape in the frequency domain. In certain configurations, to pulse shape in the frequency domain, the transmitter multiplies each symbol with a corresponding pulse shaping coefficient.

In certain configurations, to pulse shape, the transmitter compresses a frequency domain pulse shaping filter by a squeeze factor to enable faster-than-Nyquist signaling. Compressing the frequency domain pulse shaping filter increases spectral efficiency and increases peak-to-average power ratio of the time domain waveform. In certain configurations, to pulse shape, the transmitter applies a window function, such as a root-raised cosine window, to the output symbols.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a transmitter, comprising:
    receiving a plurality of input bits;
    encoding the plurality of input bits using a Trellis code to generate a plurality of output symbols, wherein the Trellis code is configured to confine amplitude fluctuations between consecutive output symbols, wherein the encoding the plurality of input bits using the Trellis code comprises:
        determining a current state; and
        determining the plurality of output symbols and a next state based on the current state and the plurality of input bits;
    pulse shaping the output symbols in a frequency domain;
    mapping the pulse shaped symbols onto a plurality of subcarriers;
    generating a time domain waveform based on the mapped symbols; and
    transmitting the time domain waveform.

2. The method of claim 1, wherein:
    the current state corresponds to a current constellation point;
    the plurality of input bits indicate a next constellation point;
    the plurality of output symbols comprise a first symbol corresponding to an intermediate constellation point corresponding to the current constellation point on a first axis and corresponding to the next constellation point on a second axis and a second symbol corresponding to the next constellation point; and
    the next state corresponds to the next constellation point.

3. The method of claim 1, wherein the using a Trellis code to generate a plurality of output symbols comprises:
    performing a frequency transform on a plurality of initial symbols output from a Trellis modulation to the generate the plurality of output symbols.

4. The method of claim 1, wherein the pulse shaping the output symbols comprises multiplying each symbol with a corresponding pulse shaping coefficient.

5. The method of claim 1, wherein the pulse shaping comprises:
    compressing a frequency domain pulse shaping filter by a squeeze factor to enable faster-than-Nyquist signaling, wherein compressing the frequency domain pulse shaping filter increases spectral efficiency and increases peak-to-average power ratio of the time domain waveform.

6. The method of claim 1, wherein the pulse shaping comprises applying a window function to the output symbols.

7. The method of claim 6, wherein the window function is a root-raised cosine window.

8. An apparatus for wireless communication, the apparatus being a transmitter, comprising:
a memory; and
at least one processor coupled to the memory and configured to:
receive a plurality of input bits;
encode the plurality of input bits using a Trellis code to generate a plurality of output symbols, wherein the Trellis code is configured to confine amplitude fluctuations between consecutive output symbols, wherein to encode the plurality of input bits using the Trellis code, the at least one processor is configured to:
determine a current state; and
determine the plurality of output symbols and a next state based on the current state and the plurality of input bits;
pulse shape the output symbols in a frequency domain;
map the pulse shaped symbols onto a plurality of subcarriers;
generate a time domain waveform based on the mapped symbols; and
transmit the time domain waveform.

9. The apparatus of claim 8, wherein:
the current state corresponds to a current constellation point;
the plurality of input bits indicate a next constellation point;
the plurality of output symbols comprise a first symbol corresponding to an intermediate constellation point corresponding to the current constellation point on a first axis and corresponding to the next constellation point on a second axis and a second symbol corresponding to the next constellation point; and
the next state corresponds to the next constellation point.

10. The apparatus of claim 8, wherein to encode the plurality of input bits using the Trellis code to generate the plurality of output symbols, the at least one processor is configured to:
perform a frequency transform on a plurality of initial symbols output from a Trellis modulation to generate the plurality of output symbols.

11. The apparatus of claim 8, wherein to pulse shape the output symbols, the at least one processor is configured to multiply each symbol with a corresponding pulse shaping coefficient.

12. The apparatus of claim 8, wherein to pulse shape the output symbols, the at least one processor is configured to:
compress a frequency domain pulse shaping filter by a squeeze factor to enable faster-than-Nyquist signaling, wherein compressing the frequency domain pulse shaping filter increases spectral efficiency and increases peak-to-average power ratio of the time domain waveform.

13. The apparatus of claim 8, wherein to pulse shape the output symbols, the at least one processor is configured to apply a window function to the output symbols.

14. The apparatus of claim 13, wherein the window function is a root-raised cosine window.

15. A non-transitory computer-readable medium storing computer executable code for wireless communication of a transmitter, comprising code to:
receive a plurality of input bits;
encode the plurality of input bits using a Trellis code to generate a plurality of output symbols, wherein the Trellis code is configured to confine amplitude fluctuations between consecutive output symbols, wherein to encode the plurality of input bits using the Trellis code, the code is further configured to:
determine a current state; and
determine the plurality of output symbols and a next state based on the current state and the plurality of input bits;
pulse shape the output symbols in a frequency domain;
map the pulse shaped symbols onto a plurality of subcarriers;
generate a time domain waveform based on the mapped symbols; and
transmit the time domain waveform.

16. The non-transitory computer-readable medium of claim 15, wherein:
the current state corresponds to a current constellation point;
the plurality of input bits indicate a next constellation point;
the plurality of output symbols comprise a first symbol corresponding to an intermediate constellation point corresponding to the current constellation point on a first axis and corresponding to the next constellation point on a second axis and a second symbol corresponding to the next constellation point; and
the next state corresponds to the next constellation point.

17. The non-transitory computer-readable medium of claim 15, wherein to encode the plurality of input bits using the Trellis code to generate the plurality of output symbols, the code is further configured to:
perform a frequency transform on a plurality of initial symbols output from a Trellis modulation to generate the plurality of output symbols.

* * * * *